United States Patent [19]

Hirata

[11] 4,228,689
[45] Oct. 21, 1980

[54] PRESSURE RELIEF MANOMETER

[75] Inventor: Tetsuyuki Hirata, Morris County, N.J.

[73] Assignee: The United States of America as represented by the Secretary of the Army, Washington, D.C.

[21] Appl. No.: 26,371

[22] Filed: Apr. 2, 1979

[51] Int. Cl.³ .............................................. G01L 7/18
[52] U.S. Cl. ..................................................... 73/747
[58] Field of Search ................ 73/747, 748, 749, 750, 73/385, 752

[56] References Cited

U.S. PATENT DOCUMENTS

| 1,582,942 | 5/1926 | Thomas | 73/747 |
| 1,918,635 | 7/1933 | Cummings | 73/747 |

Primary Examiner—Donald O. Woodiel
Attorney, Agent, or Firm—Nathan Edelberg; Robert P. Gibson; Harold H. Card, Jr.

[57] ABSTRACT

An apparatus for measuring pressure having a reservoir at its base containing a measuring fluid. Mounted on the reservoir is a uniquely constructed manometer and a side arm with a stopcock to contain fluid spillage when blowouts occur due to gas formations.

4 Claims, 1 Drawing Figure

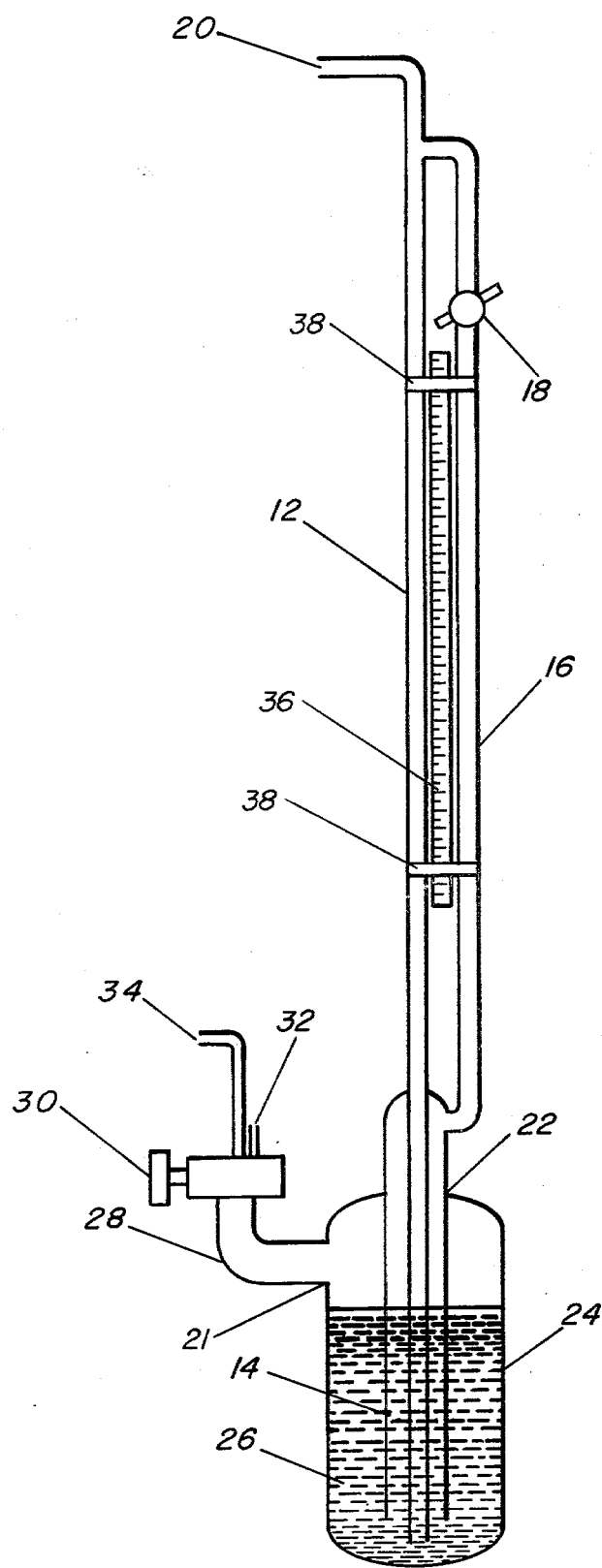

PRESSURE RELIEF MANOMETER

GOVERNMENTAL INTERESTS

The invention described herein may be manufactured, used and licensed by or for the Government for governmental purposes without the payment to me of any royalties thereon.

BACKGROUND OF THE INVENTION

This invention relates to manometers and more particularly to a manometer adapted to contain and control mercury spillage in the laboratory.

Manometer systems for measuring changes of gas pressures are well-known. Prior art devices generally comprise a U-tube, constructed of a glass tubing having one end open to the atmosphere, and the other to the region where the pressure is to be measured. Another type has one end of the U-tube to the pressure region and the other end is sealed off after evacuation. Where the pressure is different from atmospheric, the liquid with which the manometer is partially filled will stand higher in one leg of the tube than in the other. However, sudden pressure surges during testing can frequently be of sufficient magnitude to blow mercury out of the apparatus. If the end of the manometer is sealed the sudden impact against the seal end of the glass tubing would strike with sufficient force to break the tubing and cause mercury spillage on to personnel, equipment and the laboratory area. Since mercury is toxic, it is a peril to personnel and it must be properly controlled preferably within the containing unit. In addition certain U-type manometers have the disadvantage of the weight of the mercury resting on one arm of the manometer causing a weak point at the base of the U-tube.

SUMMARY OF THE INVENTION

It is therefore an object of this invention to provide a device that overcomes the above discussed problems and in addition affords a substantial measure of effectual safety during its use.

A further object of this invention is to safely moderate and contain pressure surges in the system resulting in the elimination of spillage.

Another object is to contain mercury in a reservoir so that the weight of the mercury rests on a larger surface area instead of the base of a U-tube and thus reducing the possibility of breakage.

Still a further object is to prevent atmospheric contamination of exposed mercury which over a period of time provides inaccurate readings due to scum formation.

These and other objects are accomplished by the present invention, which comprises a new construction for manometers, that can be handled with greater safety than prior design. The present invention eliminates the shortcomings of the prior art by providing a device which is simple in construction, certain and dependable in operation. The invention comprises the basic U-tube manometer wherein the bottom portion of one arm is concentrically positioned in another tube. The double tubing is then mounted into the reservoir directly above the mercury and extending to a point slightly above the base of the reservoir. The reservoir has another opening to accommodate a side arm above the level of the mercury which is used to evacuate or introduce atmospheric pressure into the system. This is accomplished by the use of the stopcocks located on the side arm and the U-tube.

The invention and a fuller understanding of its nature and objects will appear more clearly from the following detailed description taken in conjunction with the accompanying drawing, showing by way of example a preferred embodiment of its invention concept.

BRIEF DESCRIPTION OF THE DRAWING

The drawing illustrates a side view of a pressure relief manometer showing the various parts of the device in relation to each other as typically assembled.

DESCRIPTION OF THE PREFERRED EMBODIMENT

Referring to the drawing, the manometer comprises a tube 12 mounted into another tube of large diameter 14 having a barometric arm 16 to form a conventional U-tube manometer. The barometric arm 16 has a stopcock 18 to control the pressure through the barometric arm 16. The upper portion 20 of tube 12 is connected to a system being tested (not shown) while the lower portion of tubes 12 and 14 are inserted into a first opening 22 of reservoir 24 containing mercury 26. The tube extends about a half inch from the base of the reservoir 24 while the tube 14 is about a half inch above tube 12. A side arm 28 is attached to a second opening 21 on the side of the reservoir 24 directly above the mercury level and in direct communication with the contents 26 of the reservoir 24. The side arm 28 is provided with a stopcock 30 so that there is access to the atmosphere 32 and to vacuum 34.

In operation stopcock 30 is closed and stopcock 18 is opened to vacuum evacuating the system within the tubing 12 and 16. Stopcock 30 is then open to atmosphere causing the mercury to rise in both arms to a height equivalent to the prevailing atmospheric pressure. The mercury is then drawn down into reservoir well 24 by opening stopcock 30 to vacuum. Stopcock 30 is then closed and both arms are then re-evacuated of all entrapped air.

When the desired vacuum is achieved in the system, stopcock 30 is carefully opened to the atmosphere. The mercury will again rise to indicate the atmospheric pressure. Stopcock 18 is now closed and the barometric arm 16 will always indicate the prevailing atmospheric pressure. Pressure variations in the system will now register on the pressure arm 12 and the difference between the mercury heights in tubes 12 and 16 is the pressure in the system being measured. The difference is determined with a meter stick 36 that is located between tubes 12 and 16 and held in place by clips 38.

This type of blow out manometer is particularly useful in reactions conducted in a vacuum system where sudden gas formations occur with great frequency. Thus sudden pressure changes and surges will now blow out harmlessly into the reservoir 24, avoiding mercury spillage which is common in the course of laboratory work. In addition, manometer breakage is minimized by the absorption of the energy of a blow out by the larger volume of mercury in the reservoir well.

I wish it to be understood that I do not desire to be limited to the exact details of construction shown as described, for obvious modifications will occur to persons skilled in the art.

I claim:
1. A pressure relief manometer comprising:
a container for liquid;

a liquid mass in said container;

first generally upright tube means for containing a first column of said liquid responsive to barometric pressure;

second generally upright tube means substantially parallel to said first tube means, said second tube means containing a second column of said liquid responsive to pressure variations in a test area;

said first upright tube means extending into said container below the surface of said liquid and terminating at a terminal opening of said first tube means;

a portion of said second tube means extending into said container concentrically within said first tube means to a location below said liquid, said second tube means terminating at a terminal opening below said terminal opening of said first tube means, and selectively openable and closeable vent means communicating with the interior of said container for venting gas pressure within said container.

2. The manometer as recited in claim 1, wherein: said vent means included means for selectively connecting said vent means with a source of vaccuum or with atmosphere outside of said container.

3. The manometer as recited in claim 1, further including: selectively openable and closeable valve means on said first tube means for isolating said first column of liquid from the outside atmosphere.

4. A manometer which comprises:

a reservoir having a first outlet at a top surface and a second outlet operatively disposed on a side surface;

a liquid partially filling said reservoir;

a first tube having a closed top end fixedly positioned in said first outlet and an open bottom end extending into said liquid;

a second tube of smaller diameter than said first tube having a lower section hermetically sealed to and axially passing through said closed top end of said first tube and extending into said liquid to a depth below said opened bottom end of said first tube;

a barometric arm having a lower end hermetically connected to same top end of said first tube and communicating therewith and an upper end hermetically connected to an upper section of said second tube;

a first stop cock valve operatively disposed in said barometric arm intermediate said lower and upper ends of said barometric arm;

scale means fixedly connected between said second tube and said barometric arm; and valve means for alternatively evacuating and pressurizing a space above the liquid level of said liquid in said reservoir.

* * * * *